(12) United States Patent
Berens et al.

(10) Patent No.: US 9,670,961 B2
(45) Date of Patent: Jun. 6, 2017

(54) INSTRUMENTED BEARING AND METHOD OF MANUFACTURING SUCH AN INSTRUMENTED BEARING

(71) Applicants: Frank Berens, Saunay (FR); Laurent Varnoux, Saint Avertin (FR); Olivier Verbe, Tours (FR)

(72) Inventors: Frank Berens, Saunay (FR); Laurent Varnoux, Saint Avertin (FR); Olivier Verbe, Tours (FR)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 14/945,557

(22) Filed: Nov. 19, 2015

(65) Prior Publication Data

US 2016/0146256 A1 May 26, 2016

(30) Foreign Application Priority Data

Nov. 26, 2014 (FR) ..................... 14 61469

(51) Int. Cl.
| | |
|---|---|
| *F16C 33/78* | (2006.01) |
| *F16C 19/02* | (2006.01) |
| *F16C 41/00* | (2006.01) |
| *F16C 19/22* | (2006.01) |
| *F16C 43/06* | (2006.01) |
| *G01M 13/04* | (2006.01) |
| *F16C 19/52* | (2006.01) |

(52) U.S. Cl.
CPC ............ *F16C 41/008* (2013.01); *F16C 19/02* (2013.01); *F16C 19/22* (2013.01); *F16C 19/52* (2013.01); *F16C 33/7816* (2013.01); *F16C 33/7833* (2013.01); *F16C 41/007* (2013.01); *F16C 43/06* (2013.01); *G01M 13/04* (2013.01)

(58) Field of Classification Search
CPC .......... F16C 19/02; F16C 19/22; F16C 19/52; F16C 41/008; F16C 33/7816; F16C 33/7833; F16C 43/06; G01M 13/04
See application file for complete search history.

(56) References Cited

U.S. PATENT DOCUMENTS

| | | | | |
|---|---|---|---|---|
| 4,732,494 A | * | 3/1988 | Guers | ..................... F16C 33/78 324/207.22 |
| 5,026,178 A | * | 6/1991 | Ballhaus | ............... F16C 33/416 384/446 |

(Continued)

FOREIGN PATENT DOCUMENTS

| | | | | |
|---|---|---|---|---|
| DE | 19710337 A1 | * | 9/1998 | .......... F16C 33/7879 |
| EP | 2752590 A1 | | 7/2014 | |

(Continued)

*Primary Examiner* — Alan B Waits
(74) *Attorney, Agent, or Firm* — Bryan Peckjian; SKF USA Inc., Patent Dept.

(57) ABSTRACT

An instrumented bearing, which includes an outer race and an inner race between which a rolling chamber is delimited. Rolling bodies are disposed in the rolling chamber. The bearing additionally includes a member isolating the rolling chamber from the outside; and a measuring device including at least one sensor adapted to measure at least one operating parameter of the instrumented bearing. At least one measuring device can be mounted to the member isolating the rolling chamber from the outside.

13 Claims, 2 Drawing Sheets

(56) References Cited

U.S. PATENT DOCUMENTS

| | | | | |
|---|---|---|---|---|
| 5,372,435 A * | 12/1994 | Genero | G01P 3/443 | |
| | | | 277/317 | |
| 5,523,681 A * | 6/1996 | Hajzler | F16C 33/78 | |
| | | | 324/174 | |
| 5,564,839 A * | 10/1996 | Ouchi | F16C 33/7886 | |
| | | | 384/446 | |
| 5,762,425 A * | 6/1998 | Ouchi | F16C 41/007 | |
| | | | 324/207.25 | |
| 5,873,658 A * | 2/1999 | Message | F16C 33/7886 | |
| | | | 324/207.25 | |
| 5,975,761 A * | 11/1999 | Ouchi | F16C 33/723 | |
| | | | 324/207.25 | |
| 6,127,819 A * | 10/2000 | Ouchi | G01P 1/02 | |
| | | | 324/173 | |
| 6,267,509 B1 * | 7/2001 | Morimura | F16C 33/7886 | |
| | | | 324/174 | |
| 6,324,899 B1 * | 12/2001 | Discenzo | F16C 19/52 | |
| | | | 340/631 | |
| 6,559,633 B1 | 5/2003 | Nachtigal et al. | | |
| 6,863,442 B2 * | 3/2005 | Iwamoto | F16C 33/7843 | |
| | | | 384/448 | |
| 6,903,546 B2 * | 6/2005 | Nakano | G01D 11/245 | |
| | | | 324/207.25 | |
| 7,126,328 B2 * | 10/2006 | Sakamoto | F16C 41/007 | |
| | | | 324/207.25 | |
| 7,249,891 B2 * | 7/2007 | Aoki | F16C 33/586 | |
| | | | 384/448 | |
| 7,374,344 B2 * | 5/2008 | Shigeoka | B60B 27/0005 | |
| | | | 324/173 | |
| 7,534,045 B2 * | 5/2009 | Nakajima | F16C 41/008 | |
| | | | 324/136 | |
| 7,553,087 B2 * | 6/2009 | Iwamoto | F16C 19/522 | |
| | | | 324/207.22 | |
| 7,793,939 B2 * | 9/2010 | Ishikawa | F16C 19/386 | |
| | | | 277/353 | |
| 8,147,146 B2 * | 4/2012 | Norimatsu | G01P 1/026 | |
| | | | 324/207.22 | |
| 8,246,252 B2 * | 8/2012 | Yokoyama | F16C 19/525 | |
| | | | 338/22 R | |
| 8,360,649 B2 * | 1/2013 | Norimatsu | B60B 27/0005 | |
| | | | 384/448 | |
| 8,764,299 B2 * | 7/2014 | Torii | B60B 27/0005 | |
| | | | 384/448 | |
| 2006/0006601 A1 * | 1/2006 | Hufnagel | F16J 15/3228 | |
| | | | 277/317 | |
| 2010/0172605 A1 * | 7/2010 | Pausch | F16C 33/416 | |
| | | | 384/446 | |
| 2010/0283208 A1 * | 11/2010 | Hering | F16C 33/7843 | |
| | | | 277/317 | |
| 2012/0105055 A1 * | 5/2012 | Takahashi | F16C 41/007 | |
| | | | 324/207.25 | |
| 2014/0152451 A1 * | 6/2014 | Murphy | F16C 41/008 | |
| | | | 340/682 | |
| 2015/0015405 A1 * | 1/2015 | Bark | G08B 21/187 | |
| | | | 340/682 | |
| 2015/0211581 A1 * | 7/2015 | Murphy | G01H 1/003 | |
| | | | 340/682 | |
| 2015/0300405 A1 * | 10/2015 | Erskine | F16J 15/3296 | |
| | | | 384/448 | |
| 2016/0146254 A1 * | 5/2016 | Katsaros | G01K 7/02 | |
| | | | 384/448 | |

FOREIGN PATENT DOCUMENTS

| | | | | |
|---|---|---|---|---|
| FR | 2668561 A1 * | 4/1992 | | F16C 33/7866 |
| JP | 2008249078 A | 10/2008 | | |
| JP | 2009074687 A | 4/2009 | | |
| WO | WO 2013095890 A1 * | 6/2013 | | G01M 13/045 |
| WO | 2013111638 A1 | 8/2013 | | |

\* cited by examiner

INSTRUMENTED BEARING AND METHOD OF MANUFACTURING SUCH AN INSTRUMENTED BEARING

CROSS REFERENCE TO RELATED APPLICATIONS

This is a Non-Provisional Patent Application, filed under the Paris Convention, claiming the benefit of France (FR) Patent Application Number 1461469, filed on 26 Nov. 2014, which is incorporated herein by reference in its entirety.

TECHNICAL FIELD OF THE INVENTION

The present invention concerns an instrumented bearing and a method of manufacturing such an instrumented bearing.

BACKGROUND OF THE INVENTION

A bearing conventionally includes an outer race and an inner race between which a rolling chamber is delimited. The bearing also includes rolling bodies disposed in the rolling chamber and retained by a bearing cage.

The bearing may be associated with a measuring device including a sensor adapted to measure a parameter characteristic of the operation of the bearing, such as a temperature, a speed, an acceleration, a level of lubrication, a chemical or physical parameter of the lubricant such as its conductivity or its acidity, a vibratory or acoustic amplitude, for example.

The measuring device is generally disposed outside the bearing, for example in a casing receiving the outer race of the bearing or on a shaft receiving the inner race of the bearing. The measurements are therefore influenced by the environment of the bearing. Moreover, a space must be provided for positioning the measuring device in the vicinity of the bearing. Examples of integrating measuring devices are shown in WO 2010/0133924 A1 and WO 2010/088964 A1.

In order to deduce the overall size of the instrumented bearing including the measuring device, it has been proposed in WO 2006/083736 A1 to include the measuring device at least partially in the bearing cage. One of the drawbacks of this solution is that it is difficult to transmit the signals from the device to the outside and to be able to supply the device with power.

SUMMARY OF THE INVENTION

The aim of the present invention is to propose an improved instrumented bearing.

To this end, the invention consists in an instrumented bearing, including an outer race and an inner race between which a rolling chamber is delimited, at least one member isolating the rolling chamber from the outside, and at least one measuring device including at least one sensor adapted to measure at least one operating parameter of the instrumented bearing.

In accordance with the invention, the instrumented bearing is characterized in that at least one measuring device is mounted to the member isolating the rolling chamber from the outside.

In accordance with other advantageous features of the invention, separately or in combination:

The member isolating the rolling chamber is to be produced in the form of a metal flange, for example a flange of a capped bearing mounted on and rigidly fixed to one of the races of the bearing.

The member isolating the rolling chamber includes at least one elastic portion.

The isolating member is produced in the form of sealing means including a rigid support portion, for example made of metal, and a flexible sealing portion, for example made of a synthetic material or polymer.

The flexible sealing portion of the isolating member is fixed, for example glued or overmolded, onto the rigid support portion.

The flexible sealing portion includes at least one lip extending toward one of the races of the bearing and providing a sliding contact with the race.

The seal is produced by means of a labyrinth between the isolating member and one of the races of the bearing.

The measuring device is inserted in an opening in the member isolating the rolling chamber so that an inner portion of the measuring device is in contact with the interior of the rolling chamber and an outer portion of the measuring device opens to the exterior of the bearing. An intermediate portion of the measuring device passing through the opening provides a channel of communication between the inner portion and the outer portion. This communication channel can transmit mechanical, physical, chemical, electrical, magnetic or electromagnetic signals or a combination thereof.

The measuring device is produced in the form of a pin inserted in an opening in the member isolating the rolling chamber. In the context of the invention, the term pin may equally mean rivet, button or pin.

The inner portion of the pin and/or the outer portion of the pin has or have the shape of a head with a diameter greater than the diameter of the opening in the member isolating the rolling chamber.

The measuring device includes an outer portion including display means for displaying at least one indicator for the measured parameter.

The display means of the outer portion of the measuring device include a transparent portion enabling the interior of the outer portion to be seen and may contain coloring agents or an LED indicator.

The measuring device includes active elements sensitive to an operating parameter characteristic of the instrumented bearing.

The inner portion of the measuring device includes an intermediate portion capable of connecting the rolling chamber and the active elements of the measuring device. The intermediate portion may consist in a porous portion or a membrane.

The active elements of the measuring device consist in a plurality of microcapsules.

The microcapsules contain molecules designed to produce a detectable effect as a function of the parameter, for example coloring agents released or produced by molecules released if a parameter has exceeded a limit value.

The effect is irreversible. This makes it possible to memorize events in which a parameter has exceeded a limit value.

The microcapsules are arranged in a manner that is visible from outside the bearing. This makes it possible to view the effect if the effect produced is a change of color of the microcapsules or of their environment. The value of the parameter can therefore be signaled in a simple manner without using electronic components.

The microcapsules are designed to emit molecules if the parameter exceeds a limit value.

The microcapsules are dispersed inside a transparent body, a gel or a liquid of the measuring device. This makes it possible to render the coloring agents or other phenomena inside the pin visible.

The microcapsules are contained in a coating of the member isolating the rolling chamber.

The measuring device includes a wireless emitter. The wireless emitter is preferably part of an RFID tag. This enables remote interrogation.

The member isolating the rolling chamber includes a metal cap including an opening for the placement of the measuring device.

The member isolating the rolling chamber includes a plurality of measuring devices, each type of measuring device being sensitive to a different specific operating parameter of the instrumented bearing, thus making it possible to provide information for different parameters.

The member isolating the rolling chamber includes a plurality of measuring devices all sensitive to the same operating parameter of the instrumented bearing, but each measuring device being sensitive to a different threshold value of the parameter, thus making it possible to provide information for different values of the same parameter.

An operating parameter characteristic of the instrumented bearing is of mechanical type, by way of non-limiting example the speed of movement of a member, temperature, pressure, vibration.

The operating parameter characteristic of the instrumented bearing is of chemical type, by way of non-limiting example moisture content, acidity, viscosity, level of oxidation.

The measuring device is integrated into the sealing of the bearing.

The measuring device is integrated into the sealing of the bearing by virtue of being overmolded.

The measuring device is integrated into the sealing of the bearing by virtue of being clipped.

The invention therefore makes it possible to reduce the overall size of the instrumented bearing including the measuring device. The measurements of key parameters such as temperature, moisture content, impacts, excessive vibrations or excess speed are advantageously produced in a manner integrated with the bearing and not externally of the bearing. Moreover, the solution in accordance with the invention is versatile and easy to adapt, for example where the choice of the parameters to be monitored is concerned, and of relatively low cost.

Thanks to the integration of the measuring device, the invention makes it possible to respect an existing dedicated space in equipment.

The invention also consists in a method of manufacturing an instrumented bearing as referred to above. The method includes the following steps:
a) manufacturing the outer race, the inner race and the rolling bodies;
b) manufacturing the member isolating the rolling chamber with an opening;
c) inserting the measuring device in an opening of the member isolating the rolling chamber; and
d) assembling the instrumented bearing.

BRIEF DESCRIPTION OF THE DRAWINGS

The invention will be better understood after reading the following description given by way of non-limiting example only and with reference to the appended drawings, in which.

DETAILED DESCRIPTION OF SOME EMBODIMENTS

Figure 1:
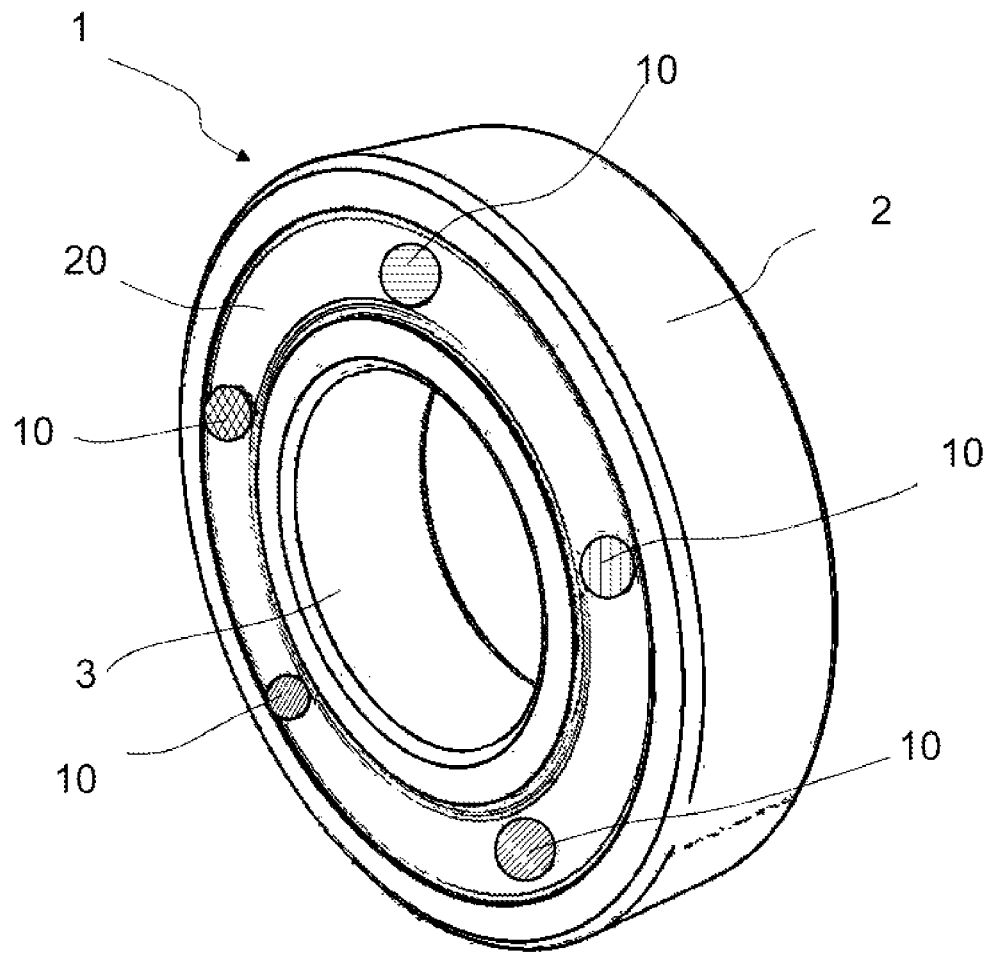
FIG. 1 is a perspective view of an instrumented bearing in accordance with the invention.
Figure 2:
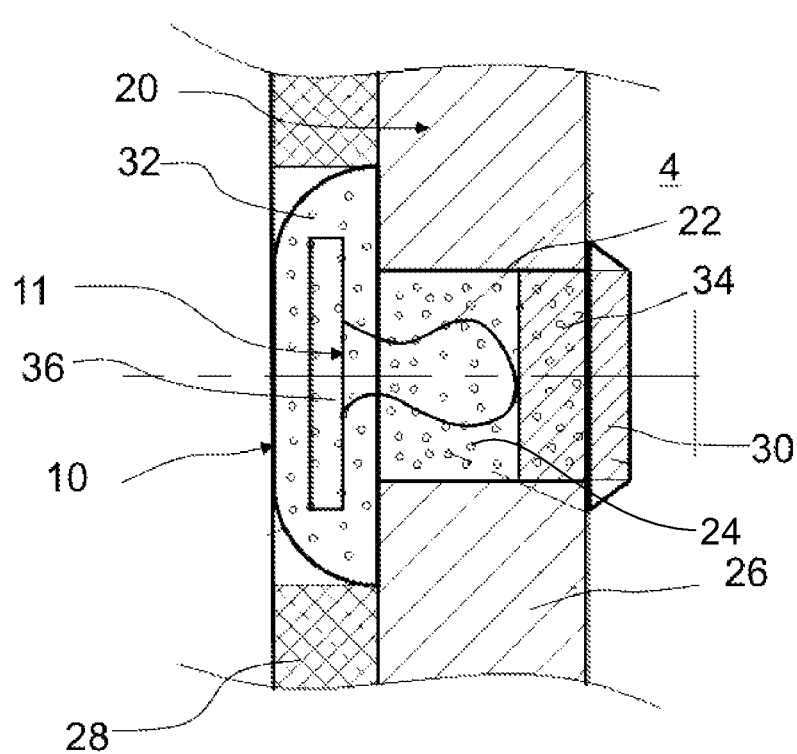
FIG. 2 is a section to a larger scale of a detail of the bearing from FIG. 1.

An instrumented bearing 1 in accordance with the invention is shown in FIGS. 1 and 2.

The bearing 1 includes an outer race 2 and an inner race 3 between which a rolling chamber 4 is delimited. The bearing 1 has a central axis, forming the axis of relative rotation of the races 2 and 3.

The bearing 1 includes rolling bodies (not shown) disposed in the rolling chamber 4 and retained by a bearing cage.

The rolling chamber 4 is isolated from the outside by a member 20 including a metal flange 26 and an overmolded elastomer 28 forming a sealing lip designed to be in sliding contact with the inner race 3. The member 20 is constrained to rotate with the outer face 2.

The bearing 1 also includes a measuring device 10 adapted to measure at last one parameter characteristic of the operation of the bearing 1.

In the context of the invention, the measuring device 10 is mounted to the member 20 isolating the rolling chamber 4, as described in detail hereinafter.

The measuring device 10 is preferably entirely disposed on the member 20 and supported by the latter, as in the example of FIGS. 1 and 2.

The measuring device 10 is produced in the form of a pin inserted in an opening 22 in the member 20 isolating the rolling chamber 4 so that an inner portion 30 of the pin is in contact with the interior of the rolling chamber 4 and an outer portion 32 of the pin is visible from the outside of the bearing 1. An intermediate portion of the pin passing through the opening 22 can provide a channel of communication between the inner portion 30 and the outer portion 32. This communication channel can transmit mechanical, physical, chemical, electrical, magnetic or electromagnetic signals or a combination thereof.

The measuring device 10 includes one or more sensors 11 adapted to detect the parameters chosen by the person skilled in the art in accordance with the circumstances. The sensors may include a temperature sensor, a sensor adapted to detect a conductivity or an acidity or a sensor adapted to detect specific molecules.

In the FIG. 2 example, the inner portion 30 of the pin and the outer portion 32 of the pin take the form of a head with a diameter greater than the diameter of the opening 22 in the member 20 isolating the rolling chamber 4.

In particular, the inner portion 30 includes a chamfer so as to facilitate the insertion of the pin in the opening 22 of the member 20.

The outer portion 32 includes display device for displaying at least one indicator for the measured parameter. These display device include a transparent portion enabling the interior of the head of the pin to be seen and may contain coloring agents or an LED indicator.

As shown in FIG. 1, the bearing 1 may be equipped with a plurality of measuring devices 10 of the type shown in FIG. 2, the various measuring devices 10 including different sensors 11 and/or containing different coloring agents. Moreover, the various sensors 11 could be adapted to measure the same parameter but use different limit values for the display. One of the measuring devices 10 could therefore change color, for example to orange, if the parameter exceeds a first limit value, and another measuring device 10 could change its color, for example to red, if the parameter exceeds a second limit value higher than the first limit value, as in a traffic light system.

The measuring device 10 includes active elements, here a plurality of microcapsules 24 containing molecules designed to produce a detectable and visible effect as a function of the parameter, for example coloring agents released or produced by molecules released if a parameter such as the temperature or the moisture content has exceeded a limit value. This effect is irreversible. Once the molecules have been released, it is impossible or very difficult to reintroduce them into the microcapsules 24. This makes it possible to memorize events in which a parameter has exceeded a limit value.

The microcapsules 24 are arranged in a manner that is visible from the outside of the bearing in a gel or in a transparent body and the release of the molecules results in a change of color of the microcapsules 24 or of their environment. This makes it possible to signal the value of the parameter in a simple manner without using electronic components.

The microcapsules 24 are dispersed inside a transparent body of the measuring device. This makes it possible to render the coloring agents or other phenomena inside the pin visible, notably via the outer part 32.

In one embodiment, the measuring device includes a wireless emitter 36 provided by an RFID tag, for example. This enables remote interrogation. A semiconductor chip of the RFID tag is adapted to measure the parameter either directly or via molecules released by the microcapsules 24. The RFID tag may include a microprocessor for interpreting and processing the data obtained by the sensors 11 of the device.

The inner portion 30 of the pin includes an intermediate portion, such as a porous portion or a membrane, capable of connecting the rolling chamber 4 and the microcapsules 24 of the measuring device 10. The physical parameter to which the microcapsules 24 are sensitive is therefore directly detectable by the microcapsules 24.

The inner portion 30 of the pin includes a feature 34 for isolation of the interior of the pin via the rolling chamber in order to prevent the microcapsules 24, the sensors 11 or electronic components escaping.

In one embodiment, the pin is manufactured directly on the flange 26 of the member by overmolding an RFID tag inserted in the opening 22 of the member 20.

Thanks to the invention, the parameters associated with the instrumented bearing 1 are measured as close as possible to the functional zone of the bearing 1, in the rolling chamber 4, which makes it possible to obtain pertinent and precise measured values. The overall size of the instrumented bearing 1 is optimized, the number of wires is reduced, notably for the supply of power and the transmission of data.

In accordance with one particular application, the invention makes it possible to analyze parameters linked to the lubrication of the bearing 1, even if this bearing 1 is protected by members 20 isolating the rolling chamber 4 from the outside (i.e. is capped bearing).

The invention also concerns a method of manufacturing an instrumented bearing 1. The method includes a step a) consisting in manufacturing the outer race 2, the inner race 3 and the rolling bodies. The method also includes a step b) consisting in manufacturing the member 20 in the form of a metal flange 26 with an opening 22 overmolded with rubber or another elastomer material 28 including a vulcanization step. The method further includes a step c) consisting in inserting the measuring device 10 in the opening 22 of the member 20 isolating the rolling chamber 6. The method finally includes a step d) consisting in assembling the instrumented bearing 1.

The instrumented bearing 1 and notably the measuring device 10 may be formed differently from FIGS. 1 and 2 and the variants referred to hereinabove without departing from the scope of the invention as defined in the claims.

Regardless of the embodiment of the invention, the measuring device 10 includes at least one sensor 11 and is at least partially mounted to the member 20 isolating the rolling chamber 4.

Moreover, some or all of the technical features of the various embodiments and variants referred to hereinabove may be combined with one another. The instrumented bearing 1 can therefore be adapted in terms of cost, functionality, overall size and performance.

The invention claimed is:

1. An instrumented bearing, including:
   a. an outer race and an inner race between which a rolling chamber is delimited;
   b. rolling bodies disposed in the rolling chamber;
   c. a member isolating the rolling chamber from the outside; and
   d. a measuring device including at least one sensor adapted to measure at least one operating parameter of the instrumented bearing;
   wherein the measuring device is mounted to the member isolating the rolling chamber from the outside,
   wherein the measuring device includes active elements sensitive to a physical parameter characteristic of the instrumented bearing,
   wherein the active elements consist in microcapsules containing molecules designed to produce a detectable effect as a function of the parameter.

2. The instrumented bearing as recited in claim 1, wherein the measuring device is inserted in an opening in the member isolating the rolling chamber so that an inner portion of the measuring device is in contact with the interior of the rolling chamber and an outer portion of the measuring device opens to the exterior of the bearing.

3. The instrumented bearing as recited in claim 2, wherein the measuring device takes the form of a pin, at least one of the inner portion of the pin and the outer portion of the pin having the shape of a head with a diameter greater than a diameter of the opening in the member isolating the rolling chamber.

4. The instrumented bearing as recited in claim 1, wherein the inner portion of the measuring device includes an intermediate portion capable of connecting the rolling chamber and the active elements of the measuring device.

5. The instrumented bearing as recited in claim 1, wherein the microcapsules are designed to emit molecules if the parameter exceeds a limit value.

6. The instrumented bearing as recited in claim 1, the measuring device further comprising a wireless emitter.

7. A method in manufacturing an instrumented bearing, wherein the instrumented bearing includes:
   an outer race and an inner race between which a rolling chamber is delimited;
   rolling bodies disposed in the rolling chamber;
   a member isolating the rolling chamber from the outside; and
   a measuring device including at least one sensor adapted to measure at least one operating parameter of the instrumented bearing;

wherein the measuring device is mounted to the member isolating the rolling chamber from the outside, the method includes the following steps:

a) manufacturing the outer race, the inner race and the rolling bodies;

b) manufacturing the member isolating the rolling chamber with an opening;

c) inserting the measuring device in the opening of the member isolating the rolling chamber; and d) assembling the instrumented bearing, wherein the measuring device includes active elements sensitive to a physical parameter characteristic of the instrumented bearing, wherein the active elements consist in microcapsules containing molecules designed to produce a detectable effect as a function of the parameter.

8. The method as recited in claim 7, wherein the measuring device is inserted in an opening in the member isolating the rolling chamber so that an inner portion of the measuring device is in contact with the interior of the rolling chamber and an outer portion of the measuring device opens to the exterior of the bearing.

9. The method as recited in claim 8, wherein the measuring device takes the form of a pin, at least one of the inner portion of the pin and the outer portion of the pin having the shape of a head with a diameter greater than a diameter of the opening in the member isolating the rolling chamber.

10. The method as recited in claim 8, wherein the outer portion includes a display component for displaying at least one indicator for the measured parameter.

11. The method as recited in claim 7, wherein the inner portion of the measuring device includes an intermediate portion capable of connecting the rolling chamber and the active elements of the measuring device.

12. The method as recited in claim 7, wherein the microcapsules are designed to emit molecules if the parameter exceeds a limit value.

13. The method as recited in claim 7, the measuring device further comprising a wireless emitter.

* * * * *